Oct. 18, 1960 — O. M. ROGERS ET AL — 2,956,628
PEANUT HARVESTER

Filed Jan. 3, 1958 — 2 Sheets-Sheet 1

(a)  (b)  (c)

INVENTORS
Odus M. Rogers
Homer A. Ramsey
BY Parker + Philpott
THEIR ATTORNEYS

Oct. 18, 1960   O. M. ROGERS ET AL   2,956,628
PEANUT HARVESTER
Filed Jan. 3, 1958   2 Sheets-Sheet 2

INVENTORS
Odus M. Rogers
Homer A. Ramsey
BY Parker & Philpitt
THEIR ATTORNEYS

United States Patent Office 2,956,628
Patented Oct. 18, 1960

2,956,628

PEANUT HARVESTER

Odus M. Rogers, Portales, N. Mex. (P.O. Box 829, Clovis, N. Mex.), and Homer A. Ramsey, 721 Rencher St., Clovis, N. Mex.

Filed Jan. 3, 1958, Ser. No. 706,927

7 Claims. (Cl. 171—60)

This invention generally relates to an improved type of harvesting machine which is particularly adapted for the harvesting of peanuts and similar root crops. More specifically, this invention pertains to an improved harvesting machine for peanuts whereby the peanut roots with peanuts attached are gripped by their stems, the roots loosened from the soil without disturbing the attached peanuts, the peanut plants then lifted upwardly and out of the soil by their stems, the roots conveyed into the path of a brushing means designed to remove the attached peanuts, and stripped peanut plant deposited upon the surface of the ground.

One object of this invention is to provide a machine which will successfully harvest all kinds and sizes of peanuts.

Another object of this invention is to provide a machine which is readily attachable to a conventional farm tractor so as to be propelled, controlled and operated therefrom.

A particular object of the invention is to provide mechanical means whereby the several operations described above can be carried out smoothly, quickly, accurately and without damage, injury or loss to the peanut crop.

A further object of the invention is to provide means of the character and for the purposes set forth capable of being readily attached and operatively connected with tractor machines now generally in use with the exercise of ordinary mechanical skill and in such a manner as to be ably operated from a power source of such tractors.

A further object of the invention is to provide a harvesting mechanism comprising a unitary structure for association in operative connection with tractors now in use and which includes means of simple nature whereby the power source of the tractor may be utilized to operate the harvesting mechanism.

A further object of the invention is to provide a harvesting machine of the character and for the purposes generally stated which includes means for mounting the same on a conventional tractor so as to be capable of being easily and accurately raised or lowered as desired in order to adapt the harvesting mechanism to different types of growing root crops.

With the foregoing objects in mind, together with others which will appear as the description proceeds, the invention consists in the novel construction, combination and arrangement of parts, all as will be described more fully hereinafter, illustrated in the drawings, and particularly pointed out in the appended claims.

Figure 5:
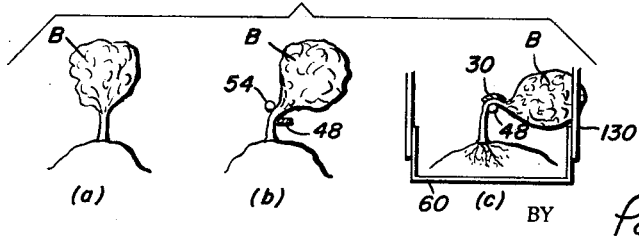
Figure 5 is an additional view showing in greatly simplified form how peanut plants are handled by the harvesting machine of this invention.
Figure 4:
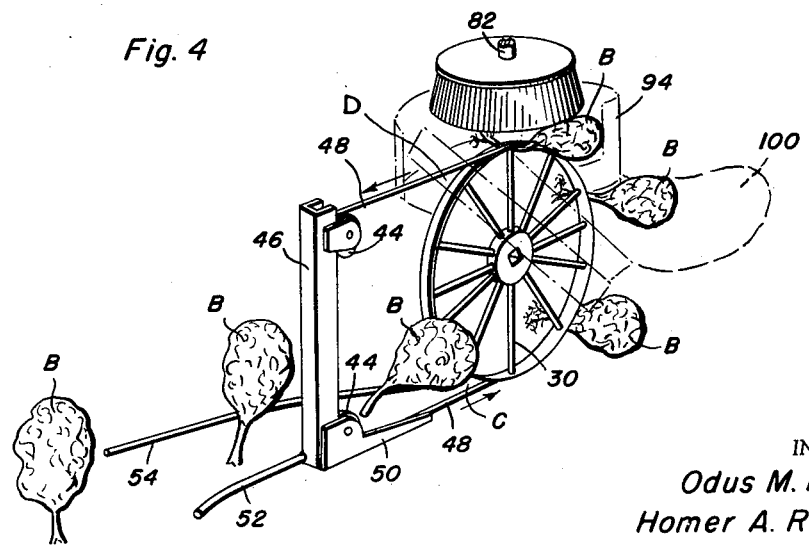
Figure 4 is a perspective view of the harvesting device of this invention detached from the tractor and with the cutter blade removed.

It is believed that the crux of this invention can be best understood and most easily grasped by referring to Figure 4 where the most essential components of the harvesting machine of this invention are shown in a fragmentary semi-exploded fashion. In Figure 4, a belt 48 travels in a path determined by belt wheel 30, and the two idling pulleys 44. A channel shaped member 46 serves the dual purpose of (1) supporting the two idling pulleys a fixed distance apart (preferably at a distance approximately equal to the diameter of the belt wheel 30) and (2) forming a guideway for the belt 48 as it moves in a downward direction. A lower belt guide and protector 50 is fixed on the bottom of channel shaped member 46. A bush guide means 52 is also fixed on the lower part of channel shaped member 46 and in conjunction with another bush guide means 54 serves to guide the stems and tops of the peanut bushes B in the hereinafter described manner. Since bush guide means 54 is curved inwardly it will cause any bushes which enter between the V-shaped slot formed by the forks of bush guide means 52 and 54 to be bent over on their sides in the manner shown as the bush guide means 52 and 54 move in a forward direction along a row of bushes. As the tractor moves forwardly the bushes B are gathered into the narrow part of the V-shaped fork formed between bush guide means 52 and 54, the bushes are bent over so that the stems and upper structure of the bushes B will be forced into the narrowing area C between the belt wheel 30 and the belt 48. The belt wheel 30 preferably has a number of ridges or projections 56 along its periphery which function to grip or pull the bushes B downwardly and rearwardly into the narrowing area C between the belt wheel 30 and the belt 48. The belt wheel preferably moves at approximately ground speed, thus holding the plants firmly but not pulling on them until the ground is loosened by the blade 60. When the bushes B are actually gripped between belt 48 and belt wheel 30 (see sketches (b) and (c) in Figure 5) the upper part of the bush is in a substantially horizontal position, and at this moment, or shortly thereafter, blade 60 cuts beneath the roots of the bush and loosens them. When the roots have been loosened in this manner, then the bush is capable of being gripped and moved as desired by belt wheel 30 and belt 48. Therefore as the belt wheel 30 turns in a counterclockwise direction, the belt 48 will move with it in an upward curved path corresponding to about one half of the circumference of the belt wheel 30. As the belt 48 and belt wheel 30 move in this manner, the bushes which have lodged between them will likewise move in an upward curved path corresponding generally to about one half of the circumference of the belt wheel 30. As the bush B moves along the back circumference of the belt wheel 30 in this fashion, it will be observed that the stem and upper part of the bush are disposed on one side of the belt wheel 30 while the roots and attached peanuts are disposed on the other side of the belt wheel 30. Now as the peanut bush is elevated in this fashion, and preferably as it nears the top of its curved path, the roots and attached peanuts are caused to come into contact with a rotating brush 62 so that the impact of the rotating brush will cause the peanuts adhering to the roots to be brushed off. The rotating brush is preferably a wire brush. The peanuts so removed by the rotating brush may be collected in any suitable type of receptacle and the threshed peanut bushes either allowed to drop back on the ground or collected in any desired type of receptacle.

Figure 1:
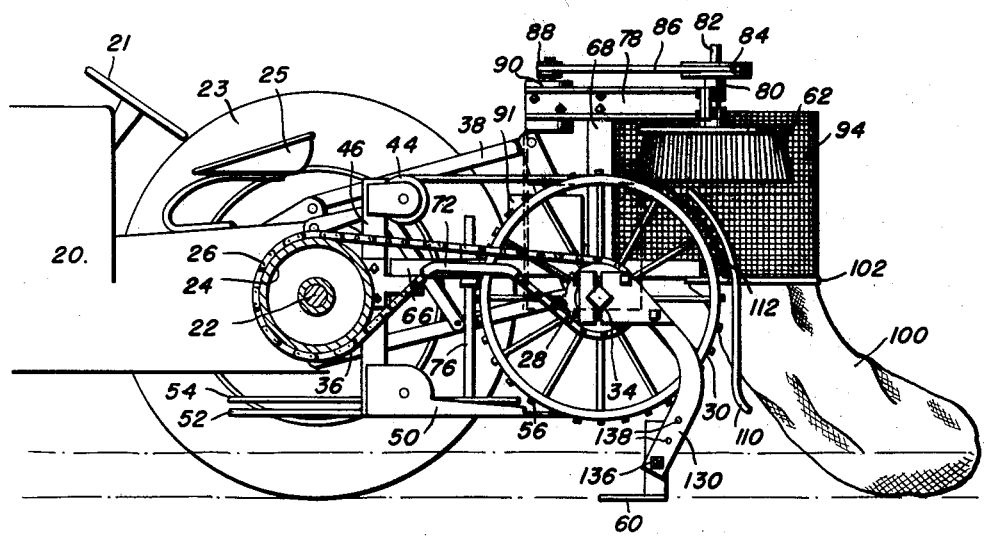
Figure 1 is a side elevational view of a conventional tractor with parts removed having the novel harvesting machine of this invention attached thereto.
Figure 2:
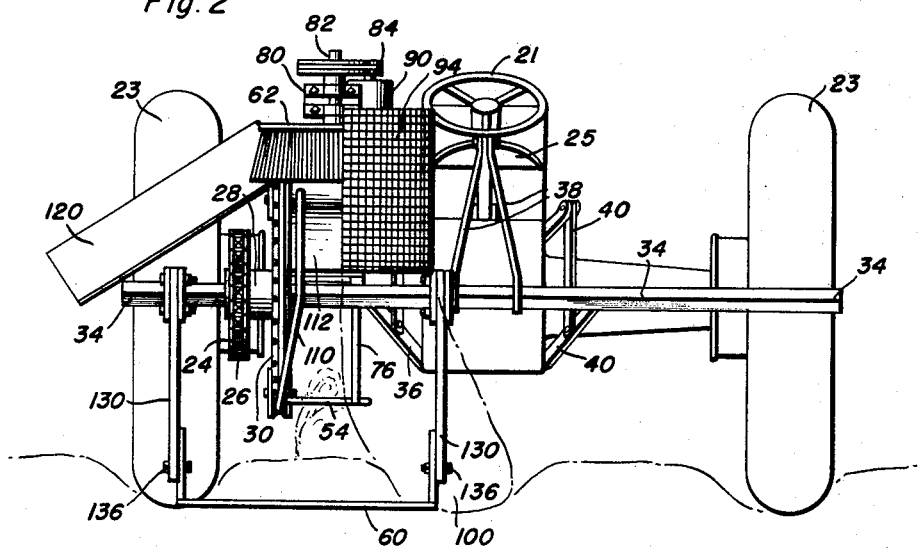
Figure 2 is a back view of Figure 1.
Figure 3:
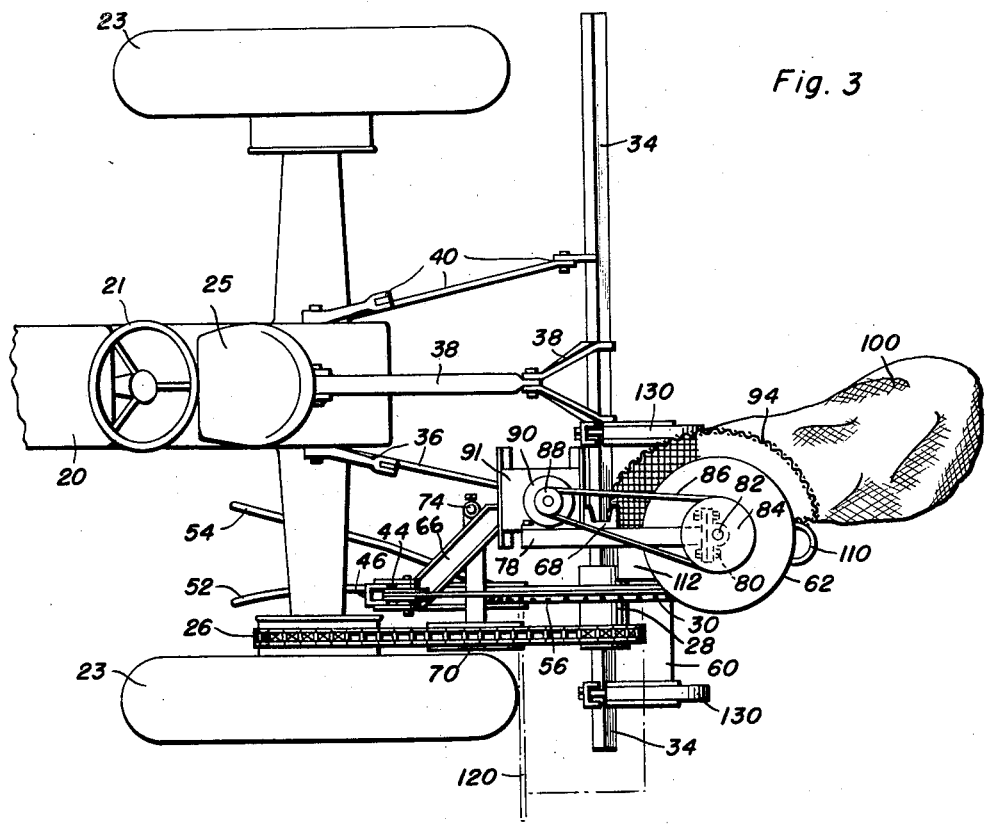
Figure 3 is a plan view from above of the tractor and peanut harvesting machine combination shown in Figure 1.

Having thus obtained an idea as to function of the most essential feature of the harvesting machine of this invention, reference to the remaining figures of the drawing will provide one with a clearer concept as to how these most essential features of the invention are related to other necessary mechanical units. Referring now more particularly to Figures 1, 2 and 3, the body of a power tractor is indicated generally at 20, having a steering wheel 21, tractor seat 25 and a rear axle 22 which carries traction wheels 23. It will be understood that although the harvesting machine of this invention has been shown as being attachable to a tractor, the entire combination of the tractor and the harvesting machine could be made as a single unit if so desired. The tractor may be of any approved or desirable construction and arrangement.

As far as the harvesting machine is concerned, it will be noted that the axle 22 of the tractor 20 contains an appropriate type of takeoff drive means 24 for driving a sprocket drive chain 26. Sprocket drive chain 26 is in effect an endless loop, the other end of which operatively engages sprocket teeth located on sprocket wheel 28. Sprocket wheel 28 is rigidly interconnected to the enlarged belt wheel 30. Sprocket wheel 28 and belt wheel 30 are, however, freely rotatable upon rectangularly-shaped elongated cross bar 34 and thus can be rotated by chain 26. Rectangularly shaped cross bar 34 is actually a main support bar for the major components of the harvesting machine. Main support cross bar 34 is maintained in the desired position above the ground by the three hinge-type fulcrum support members 36, 38, and 40 which are attached to a portion of the tractor 20 and which extend backwardly therefrom to the cross bar 34. Fulcrum-support combinations of this sort are quite commonly used in connection with tractors and tractor attachments and therefore a detailed explanation does not appear to be necessary here. Suffice it to say that support member 38 can be raised or lowered at will by mechanical or hydraulic means so as to regulate the height of main support cross bar 34 above the ground. Any equivalent support and drawbar arrangements may be used.

Referring again to Figures 1–3, it will be observed that the belt wheel 30 will rotate in a counterclockwise direction when the sprocket drive chain 26 moves in a counterclockwise direction (looking at Figure 1). Belt 48 will of course move with belt wheel 30. The channel shaped member 46 which supports idler pulleys 44 (and thereby belt 48) is held in the desired vertical position by angled support bar 66 which is in turn welded or otherwise joined to main support post 68. Main support post 68 is bolted, welded or otherwise fastened to the cross bar 34. Angled support bar 66 has an extension 70 attached on one end thereof which carries a belt tightener 72 and a bracket 74 on the other end thereof holding a downwardly depending extension 76. Bush guide means 54 is attached to the lower extremity of depending extension 76.

Main support post 68 also carries brush support member rotatable support for rotating brush 62 and its rotor 82. located on the rear end thereof provides an appropriate rotable support for rotating brush 62 and its rotor 82. As shown the rotor 82 contains a drive pulley 88 which is driven by pulley belt 86, motor pulley 84 and drive motor 90. In the preferred embodiment it is preferred for the sake of initial cost that the drive motor 90 be driven by an adjacent battery 91, but it is realized that there are any number of ways by which the drive pulley 84 and rotor 82 could be driven utilizing power available from the tractor.

Since rotating brush 62 rotates at considerable speed and with considerable force, it is usually desirable to surround the area adjacent to the rotating brush with a circular or semicircular section of wire material 94 having holes small enough to prevent the detached peanuts from passing through but large enough to permit dirt and other undesirable debris to pass through unhindered. Of course, after the detached peanuts are thrown outwardly and hit wire material 94, they will drop downwardly into collecting means 100, which may be a burlap bag. Collecting means 100 may be suspended from a ring member 102 located on the bottom of the wire material 94 or it may be suspended in the appropriate position by any other desired type of support means. Wire material 94 may be supported in the desired position by any suitable arrangement of brackets attached to the main support post 68.

To insure that the roots and attached peanuts are properly guided into the path of rotating brush 62, it is preferable to employ guide means such as is shown at 110 and 112. Curved rod 110 and curved baffle guide plate 112 may be supported upon cross bar 34 in any desired manner.

When the peanuts have been removed from the roots of the peanut plant, the stripped peanut bush is released from the grip of the belt wheel 30 and the belt 48 when these two members draw away from each other at point D. When the stripped peanut bushes are thus released they may be allowed to drop into inclined trough 120 and the threshed peanut bushes thereafter deposited in a row for later recovery.

The blade 60 is held in a horizontal position so as to travel at the desired depth beneath the soil by means of two blade support members 130. The upper ends of blade support members 130 are attached to cross bar 34 by appropriate fastening means, such as brackets and bolts. The depth to which blade 60 penetrates the ground is governed by appropriate adjustment of the previously described adjustable fulcrum support members 36, 38 and 40. The blade depth can also be varied by placing the bolts 136 in a higher or lower hole 138.

Although a peanut harvester has been described which will harvest only one row of peanut bushes, it will be obvious that by utilizing and expanding the basic mechanical arrangement hereindisclosed, one could easily build a harvester capable of harvesting any number of rows of peanut plants.

From the foregoing, it is obvious that we have provided a device for harvesting and operating upon peanut crops which is of extremely simple construction and which has its mechanical parts so assembled and arranged so as to be readily driven by tractor power.

In conclusion, while the foregoing specification and drawing describe the construction, operation and use of one preferred embodiment of the instant invention, it is to be understood that we do not intend to limit ourselves to the precise constructions and arrangements herein disclosed, since the various details of construction, form and arrangement may obviously be varied to a considerable extent by anyone skilled in the art without really departing from the basic principles and novel teachings of this invention and without sacrificing any of the advantages of the invention, and accordingly it is intended to encompass all changes, variations, modifications and equivalents falling within the scope of the appended claims.

What is claimed is:

1. A peanut harvesting machine which comprises a combination of a tractor, a peanut harvesting mechanism, and a coupling means between said tractor and said peanut harvesting mechanism, the improvement in said peanut harvesting mechanism comprising: a belt wheel rotatable in a vertical plane parallel to the direction of movement of the tractor, an endless belt pressing tightly against said belt wheel along a considerable portion of its outer circumference, guide means operatively associated with said belt and disposed in leading relation thereto; the guide means bending peanut bushes from a vertical position to a horizontal position between said belt and wheel adjacent their lowest point of contact, and blade means mounted on said frame below said lowest point of contact of said belt and wheel, rotating brush means operatively associated with said belt and wheel and disposed to contact the portion of said horizontally positioned brushes, whereby to detach peanuts attached to said bushes, means driving said belt wheel and rotating brush, collecting means operatively associated with said brush to receive said detached peanuts.

2. A peanut harvesting machine according to claim 1 wherein said belt wheel is driven by a power takeoff from the tractor.

3. A peanut harvesting machine according to claim 2 wherein said rotating brush is driven by a power source separate from the tractor power.

4. A peanut harvesting machine according to claim 1 wherein said endless belt engages the belt wheel for approximately one half of its circumference.

5. A peanut harvesting machine according to claim 1, wherein said guide means comprises two members which substantially form a "V."

6. A peanut harvesting machine according to claim 1 wherein wire retaining means surrounds a substantial portion of the area around said rotating brush means.

7. A peanut harvesting machine according to claim 1 wherein a curved baffle guide plate is located adjacent to said rotating brush means whereby to insure that the roots and attached peanuts are properly guided into the path of the rotating brush means.

References Cited in the file of this patent

UNITED STATES PATENTS

| 944,945 | Calkins | Dec. 28, 1909 |
| 1,249,445 | Meador | Dec. 11, 1917 |
| 1,251,425 | Rodgers et al. | Dec. 25, 1917 |
| 1,784,081 | Urschel | Dec. 9, 1930 |
| 2,368,895 | Spiegl | Feb. 6, 1945 |
| 2,703,953 | Altemus | Mar. 15, 1955 |

FOREIGN PATENTS

| 1,022,599 | Belgium | Dec. 17, 1952 |